United States Patent
Lutnaes

(10) Patent No.: US 7,391,410 B2
(45) Date of Patent: Jun. 24, 2008

(54) INPUT DEVICE FOR TOUCH SCREEN

(75) Inventor: Sturla Lutnaes, Uppsala (SE)

(73) Assignee: Sony Ericsson Mobile Communications AB, Lund (SE)

( * ) Notice: Subject to any disclaimer, the term of this patent is extended or adjusted under 35 U.S.C. 154(b) by 402 days.

(21) Appl. No.: 10/527,289

(22) PCT Filed: Sep. 3, 2003

(86) PCT No.: PCT/EP03/09743

§ 371 (c)(1),
(2), (4) Date: Mar. 9, 2005

(87) PCT Pub. No.: WO2004/025546

PCT Pub. Date: Mar. 25, 2004

(65) Prior Publication Data

US 2005/0259074 A1    Nov. 24, 2005

Related U.S. Application Data

(60) Provisional application No. 60/410,051, filed on Sep. 12, 2002.

(30) Foreign Application Priority Data

Sep. 9, 2002    (EP)    ................................. 02020134

(51) Int. Cl.
*G06F 3/033*    (2006.01)

(52) U.S. Cl. ........................................ 345/161; 345/179

(58) Field of Classification Search ................. 345/161, 345/179, 173, 168, 156, 184; 463/37, 38
See application file for complete search history.

(56) References Cited

U.S. PATENT DOCUMENTS

| 5,982,355 | A | 11/1999 | Jaeger et al. | ................. 345/161 |
| 2002/0105503 | A1* | 8/2002 | Oueslati et al. | ............. 345/173 |
| 2003/0076302 | A1* | 4/2003 | Langstraat | ................... 345/161 |
| 2003/0235452 | A1* | 12/2003 | Kraus et al. | ................. 400/472 |

FOREIGN PATENT DOCUMENTS

| EP | 0 743 590 A2 | 11/1996 |
| JP | 2001202152 | 7/2001 |
| WO | WO 01/95050 A1 | 12/2001 |

* cited by examiner

OTHER PUBLICATIONS

International Search Report dated Nov. 12, 2003 for corresponding PCT application No. PCT/EP03/09743.

*Primary Examiner*—Amr Awad
*Assistant Examiner*—Dennis P Joseph
(74) *Attorney, Agent, or Firm*—Myers Bigel Sibley & Sajovec, P.A.

(57) ABSTRACT

A movement input device for use on a touch screen and a portable electronic device including such a device are described. The movement input device includes a fastening unit securing the movement input device on the portable electronic device, and a user input unit extending through the fastening unit. The user input unit includes a user actuation part protruding from a top side of the fastening unit and actuatable by a user for free angular movement around an axis (X) and a touch screen contact part protruding from a bottom side of the fastening unit, which is arranged to contact the touch screen in a position where at least an angle of the contact position corresponds to an angle of the user actuation part. Movement of the user input unit is thus detected on the touch screen.

11 Claims, 3 Drawing Sheets

INPUT DEVICE FOR TOUCH SCREEN

RELATED APPLICATIONS

The present application is a 35 U.S.C. §371 national phase application of PCT International Application No. PCT/EP2003/009743, having an international filing date of Sep. 3, 2003, and claiming priority to European Patent Application No. 02020134.9, filed Sep. 9, 2002, and United States Provisional Application No. 60/410,051, filed Sep. 12, 2002, the disclosures of which are incorporated herein by reference in their entireties. The above PCT International Application was published in the English language and has International Publication No. WO 2004/025546 A1.

TECHNICAL FIELD OF THE INVENTION

The present invention relates to the field of portable electronic devices having touch screens on which information can be input. More particularly the present invention relates to a movement input device and a portable electronic device having a touch screen and including such a movement input device, where movement inputs are detected on the touch screen.

DESCRIPTION OF RELATED ART

It is known within the field of portable electronic devices to provide these with touch screens. For instance Ericsson has a mobile phone model R380, which has a touch screen and a flip provided with keys that go through the flip and touch the touch screen for entering numbers and selecting functions. The mobile phones of today are getting more and more advanced and also often have different applications like games provided in them. In the future it might also be possible to download applications into them. When a user of a phone is playing such games, he will often feel a need for a user input device that can provide movement information, for example for positioning, in an way that is free at least regarding angle around an axis of the device.

There exist several such devices today, for instance joysticks or game pads for providing such movement input to computers and game machines.

Today there does however not exist such a movement input device for portable electronic devices having touch screens, which are cheap and can be used easily. Such a device can be provided directly on a touch screen, but then it is limited to arrow buttons. Arrow buttons on a touch screen do not give the user a good enough control of a game to be played. Today the space on portable electronic devices is furthermore limited, why extra devices and input devices on them have to be considered carefully before being added to the ones already existing.

There exist a joystick that can be fitted on a phone for playing games. This device exists for a number of Nokia mobile phone models and uses the buttons provided on the phone for providing four-way movement with four of the original phone buttons. This is however a "digital" type of movement and will not give a user the best way of performing movement in a game. This is no real improvement to providing arrow buttons directly on the touch screen, but rather replaces it. A user is thus here limited to movement in four directions decided by the underlying keys.

U.S. Pat. No. 5,982,355 describes a joystick that is provided on a touch screen of a remote control. However here the movement of the joystick is sensed by different type of sensors like Hall effect sensors or strain gauge sensors. This is thus equivalent to providing a separate user motion input device.

There is thus still a need for a simple and cheap movement input device to be used in conjunction with a touch screen and which can receive user inputs that at least correspond to the user movement of the device in an angle around an axis provided generally perpendicular to the touch screen.

SUMMARY OF THE INVENTION

The present invention is thus directed towards the problem of providing fine detection of user movements with a movement input device in relation to a touch screen.

Another problem that the invention is directed towards is the problem of providing full detection of at least the angle of rotation around an axis by a movement input device provided for a touch screen.

One object of the present invention is thus to provide a movement input device, which provides fine detection of user movements with a movement input device in relation to a touch screen.

According to a first aspect of the invention this object is achieved and this problem is solved by a movement input device for use on a touch screen of a portable electronic device comprising: a fastening unit for securing the movement input device on the portable electronic device and having a top and bottom side, said unit also being arranged for being placed over at least parts of the touch screen, and a user input unit fastened in and stretching through the fastening unit. The user input unit comprises: a user actuation part protruding from the top side of the fastening unit and being possible to actuate by a user for free angular movement with an angle of rotation around an axis provided at least generally perpendicular to the top and bottom sides of the fastening unit, and a touch screen contact part protruding from the bottom side of the fastening unit, which, when the device is placed for use on the touch screen and upon actuation by the user of the user actuation part, is arranged to contact the touch screen in a position where at least an angle of the contact position corresponds to the angle of the user actuation part, so that movement of the user input unit is detected on the touch screen. A second aspect of the invention includes the features of the first aspect, wherein the user actuation part and the touch screen contact part furthermore are joined together by a fastening part being fastened in the fastening unit while still allowing free movement round said axis.

Another problem that the present invention solves is the provision of "analog" detection of radial movement of the movement input device.

A third aspect of the present invention solves this problem. The third aspect of the invention includes the features of the first aspect, wherein the touch screen contact part furthermore comprises a pin for direct contact on the screen so that a radial movement of the touch screen contact part from the axis corresponds to the radial movement of the user actuation part.

A fourth aspect of the invention includes the features of the third aspect, wherein the touch screen contact part also comprises a spring arranged to force the pin in contact with the touch screen.

A fifth aspect of the invention includes the features of the first aspect, wherein the touch screen contact part further comprises a disc having a rim, which contacts the screen at a fixed distance from the axis of the screen upon actuation of the user actuation part.

A sixth aspect of the present invention includes the features of the fifth aspect, wherein the disc has parabolic shape.

Another object of the present invention is to provide a portable electronic device, which provides fine detection of user movements using a movement input device together with a touch screen.

According to a seventh aspect this object is achieved by a portable electronic device comprising: a body comprising: a touch screen for detecting inputs from a user on said screen, and a movement input device for use on said touch screen comprising: a fastening unit for securing the movement input device on the body and having a top and bottom side, said unit also being arranged for being placed over at least parts of the touch screen, and a user input unit fastened in and stretching through the fastening unit. The user input unit comprises: a user actuation part protruding from the top side of the fastening unit and being possible to actuate by a user for free angular movement with an angle of rotation around an axis provided at least generally perpendicular to the top and bottom sides of the fastening unit, and a touch screen contact part protruding from the bottom side of the fastening unit, which, when the movement input device is placed for use on the touch screen and upon actuation by the user of the user actuation part, is arranged contact the touch screen in a position where at least an angle of the contact position corresponds to the angle of the user actuation part, so that movement of the user input unit is detected on the touch screen.

An eight aspect of the invention includes the features of the seventh aspect and further includes an input determination unit (40) for determining positions of input from a user.

A ninth aspect of the invention includes the features of the seventh aspect, wherein the fastening unit is further rotatably connected to the body.

A tenth aspect of the invention includes the features of the ninth aspect, wherein the body further comprises a fastening unit sensing device arranged to sense if the fastening unit is in position for providing inputs from the movement input device on the touch screen.

An eleventh aspect of the invention includes the features of the seventh aspect, wherein the device is a mobile phone.

The invention has the following advantages. It does not take up any extra space on the phone. It also uses the touch screen display, which is already provided on the phone. Since the movement input device only includes mechanical components, it is. cheap and easy to manufacture. It also allows good position sensing, which is an advantage in some applications, like for instance games.

According to a preferred embodiment of the invention both angular and radial movement of a movement input device are detectable in an "analog" fashion.

According to a second embodiment of the invention only the angular movement of a movement input device is detectable in "analog" fashion. The radial movement is here detected in "digital" fashion.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
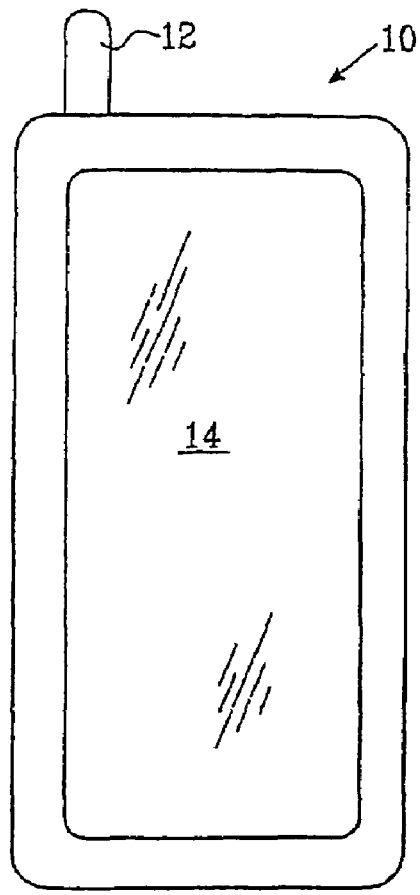
FIG. 1 shows a portable electronic device in the form of a mobile phone having a touch screen.

A portable electronic device 10 according to the invention is shown in FIG. 1. In the preferred embodiment the device is a mobile phone 10 having an antenna 12 and a display 14. It should be realised that the portable electronic device need not be a phone, but can be any other type of portable electronic device, like a PDA (personal digital assistant), a palm top computer, a lap top computer or some type of gaming machine for playing games. The screen 14 is here a touch screen onto which it is possible to enter information directly onto the screen such as selection of functions or applications and controlling these functions and applications.

Figure 2:
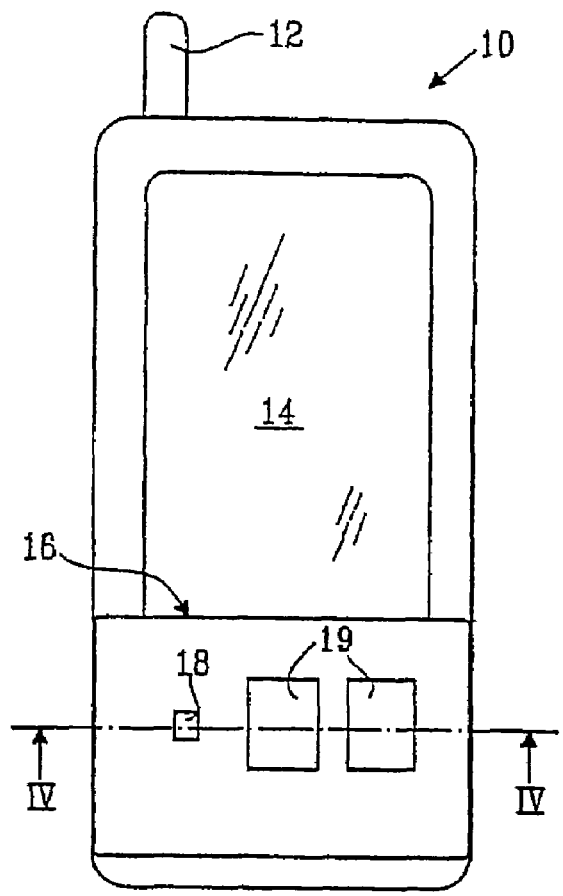
FIG. 2 shows the portable electronic device on which a movement input device according to the invention is provided.

In the phones of today there are emerging more and more applications for instance in the form of games that can be played. These games can be provided in the phone beforehand, be downloaded into the phone from a network or added to the phone in some other suitable way. These applications can often need a joystick or some other type of input device that provides movement input. It is hard to provide such devices directly on the screen and a user furthermore often prefers to hold the joystick in his hand when for instance playing games. In order to solve this, the phone shown in FIG. 1 is provided with a movement input device according to the invention. The combined phone and movement input device are shown in FIG. 2. The movement input device includes a fastening unit in the form of a lid 16 provided with a user input unit in the form of a joystick 18. The movement input device may also include gaming buttons 19. The joystick 18 and buttons are used in conjunction with the touch screen 14 of the underlying phone 10. The lid covers at least parts of the touch screen.

Figure 3:
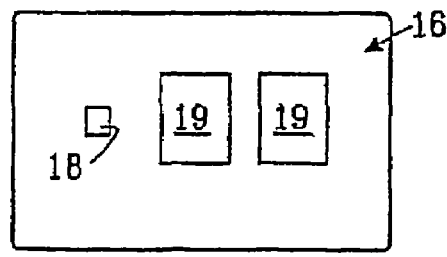
FIG. 3 shows the movement input device according to the invention by itself.

The fastening unit can be provided in many ways. It can be a flip, which is securely fastened onto the body of the phone and rotatable around the bottom end of the phone. It can be a sliding body, which slides up and down along the length of the phone. It can also be a lid, which is snapped on, either with hinges for rotation around the body or without. It can also be provided in the form a. sleeve to the phone. It can furthermore be provided in the form of a thin plate, which engages the sides of the phone in order to stay placed over the touch screen and only has enough space for retaining a user input unit. There are thus a number of ways in which the device can be fastened to and be made to cooperate with the phone. In order to demonstrate that the movement Input device can be separate from the phone it is shown by itself in FIG. 3. The movement input device can furthermore include more or fewer buttons than what is shown. It can for example also include keys that are to be used for telephony and also be provided without the gaming buttons 19. In its simplest form it is thus provided with only a joystick or some other type of user input unit.

The movement input device can be a part sold together with the phone or a part provided as an extra accessory and sold separately, for instance from a game provider.

Figure 4:
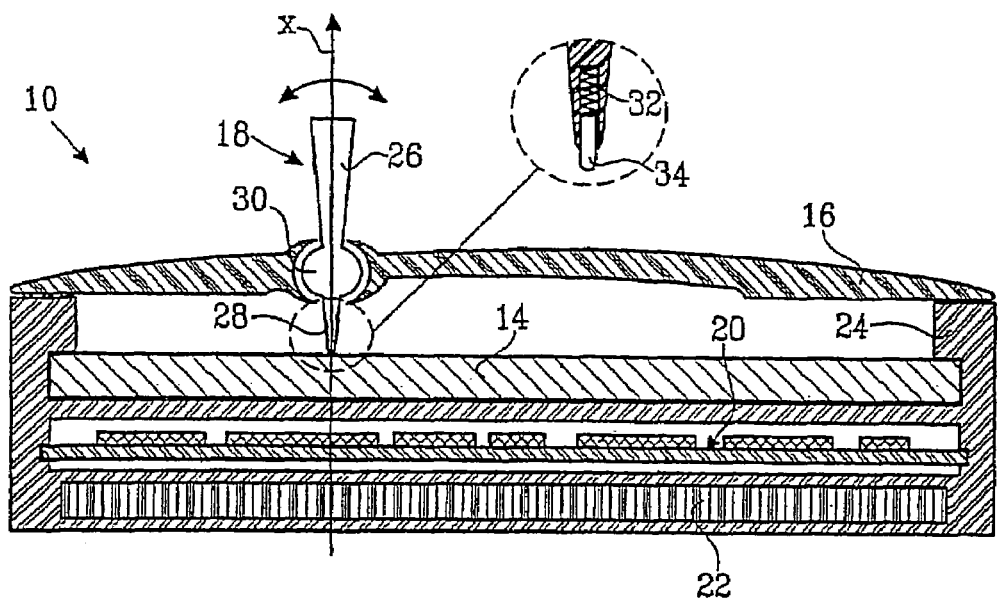
FIG. 4 shows a sectional view of a movement input device according to a first embodiment of the invention as well as relevant parts of the portable electronic device.

FIG. 4 shows a sectional view of a first preferred embodiment of the movement input device according to the invention together with different parts of the cellular phone 10, where the section has been taken along line IV-IV of FIG. 2. The gaming buttons have here been omitted for better understanding of the invention. These do however contact the touch screen in a known way, when being depressed. The user input unit 18 is in constant contact with the touch screen 14 via the lid 16. The touch screen 14 is provided in a body 24 of the phone, which also comprises a PCB (printed circuit board) 20 including a number of circuits as well as a battery 22. The user input unit 18 includes a user actuation part 26 in the form of a stick functioning as a joystick, joined to a touch screen contact part 28 via a ball shaped fastening part 30. The -lid has a top side from which the user actuation part 26 protrudes and a bottom side from which the touch screen contact part 28 protrudes. The fastening part 30 is placed in a compartment inside the lid 16 formed after the shape of the fastening part. It should be realised that this is just one way of providing fastening of the user input unit in the lid. There are many other ways in which this can be done. What is important though is that the user input unit is securely fastened in the lid while allowing free movement in relation to an axis at least generally perpendicular to the lid and to the touch screen 16 when the lid is placed thereover. The axis is denoted with X and is shown going straight through the middle of the user input unit, when a user does not actuate this unit. The axis is thus also generally perpendicular to the top and bottom sides of the lid.

The touch screen contact part 28 is shown in an enlargement close to the device. From this enlargement it can be seen that the touch screen contact part 28 includes a pin 34 fastened to the rest of the user input unit via a spring 32. The spring is dimensioned so that enough pressure is provided for receiving movement information while at the same time avoiding damage to the touch screen. The device can function without the spring, but then unwanted damages on the touch screen might occur. The pin 34 also has a blunted top in order not to unnecessarily scratch the surface of the touch screen 14. With this user input unit, the user actuation part 26 can be moved freely all the way round the axis X. Different sizes of radial movement are also possible to obtain. Because of the pin 34 the touch screen then can detect the whole angular movement round the axis X made by a user and also the complete radial movement that is possible to be made by a user. The screen thus detects a corresponding angle and radial movement. There is a slight difference between actuated and detected angle in that the detected angle is opposite to the angle moved by the user. This is easily handled by the-application in question or by a separate movement translator provided in the phone. All angular movements and also all allowed radial movements are thus detected. The device is thus "analog" in nature.

It is possible to provide a direct angular correspondence between the user actuation part and touch screen contact part in a variation of the above-described embodiment. This is done by using a pair of meshing gears provided between the user actuation part and the touch screen contact part. This is however a somewhat ineffective and expensive method.

Figure 5:
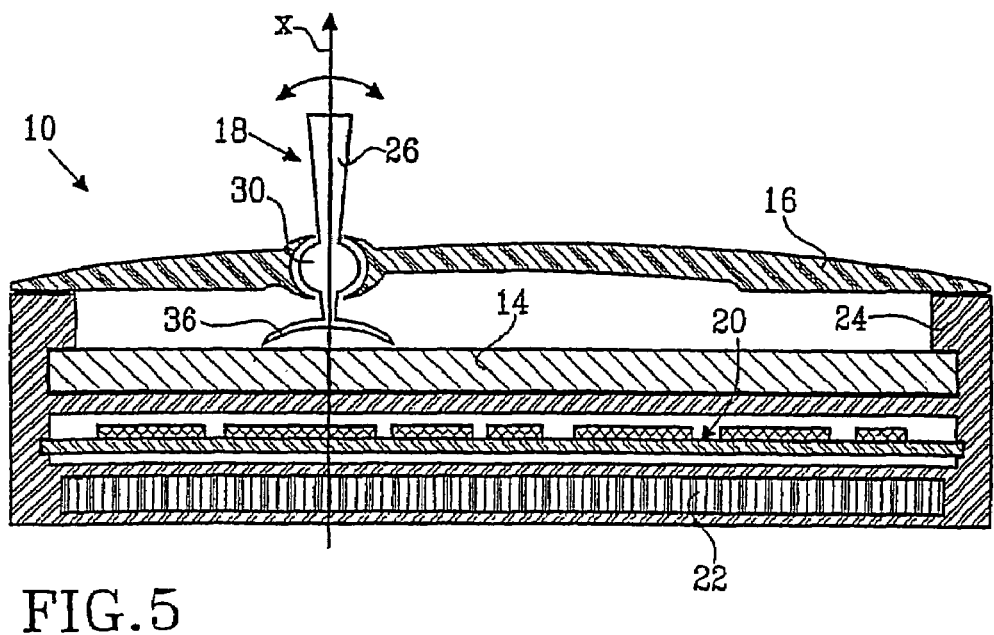
FIG. 5 shows a sectional view of a movement input device according to a second embodiment of the invention as well as relevant parts of the portable electronic device.

FIG. 5 shows a sectional view of a second embodiment of the movement input device according to the invention. Here the parts of the phone are the same as shown in FIG. 4 and the user actuation part is also the same as before, why these will not be described further. The difference here is that the touch screen contact part has another shape. The touch screen contact part 36 is here provided in the form of a parabolically shaped disc facing the touch screen. In the unused state this disc is not in contact with the touch screen 14. When the user actuation part 26 is moved, a point of the rim of the disc will get in contact with the touch screen 14, which point is then detected to be used by the application. With this touch screen contact part 36 free movement around the axis is also allowed. All angular movements are thus detected. The angular movement is thus analog in nature. The radial movement is however always of the same magnitude. The radial movement Is thus "digital" in nature. This device does not need a spring and here there does not have to be a translation of the angle either.

Figure 6:
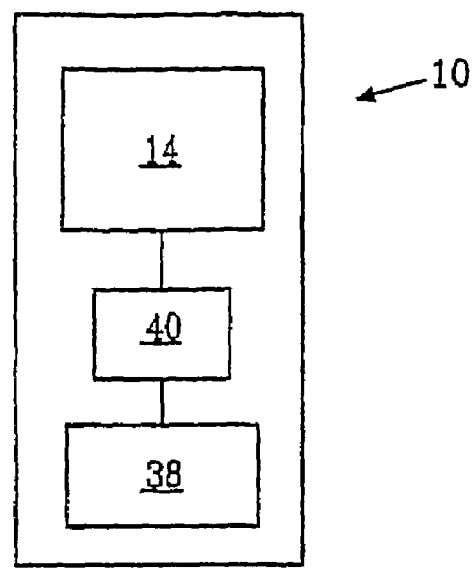
FIG. 6 shows a block schematic of the interior parts of the phone used when using an application.

The disc can be varied in many ways. It does not have to be parabolic, although this is preferred. It can also be provided by a disc having a number of sides for instance 32 or 64 sides, each curved though. The position will then not be as exactly indicated as with a parabolic disc. It is also possible to have a plane round disc instead FIG. 6 shows a block schematic of some of the parts of the phone in FIG. 1. The touch screen 14 is connected to an input determination unit 40, which in turn is connected to an application unit 38 on which an application is run and preferably a game. The input determination unit 40 determines type of input by a user on the touch screen. This input determination unit determines if the input is a movement input or another type of input. If it is a movement input it calculates rotated angle, possible radial movement and possible angle translations. Here the area of the touch screen where the user input unit can be In contact has been defined as an application user area. When using the movement input device together with an application like a game, parts of the display, normally the part not covered by the lid, is used for displaying the game and the other part covered by the lid is provided as an input portion. The gaming buttons 19 can her also be used for additional functions than movement, and would then also act on the touch screen in a known way.

Figure 7:
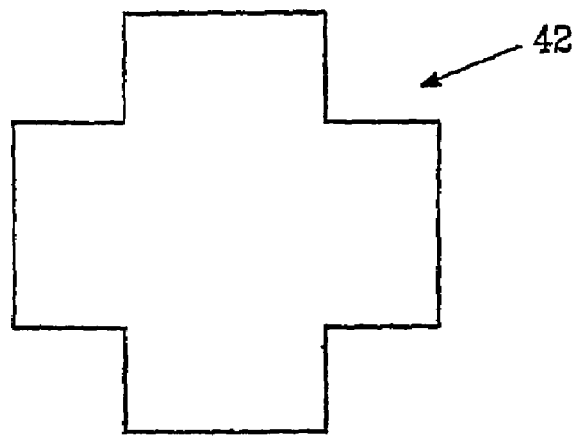
FIG. 7 shows a first variation of a user actuation part according to the invention.
Figure 8:
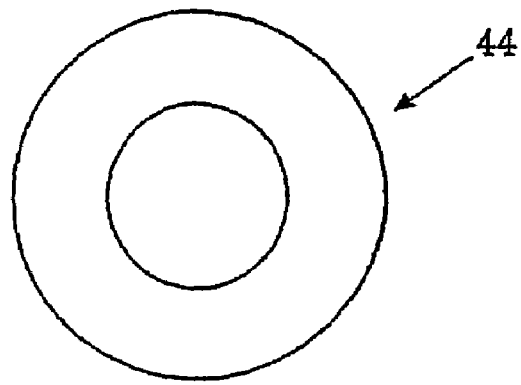
FIG. 8 shows a second variation of a user actuation part according to the invention.

FIG. 7 shows a variation of the user actuation part. In the previously described embodiments it was a stick. It can however also be a cross shaped thumb plate 42 as in FIG. 7 or a thumb plate 44 of circular shape as in FIG. 8. The plate can also have four. corners or eight corners. There are thus a number of possible shapes.

When using the movement input device according to the invention there might be other variations provided in the phone. The phone might accept several different lids, where one is used for games and another for phoning etc. In this case the phone might be provided with a sensor In the body sensing that there is a lid present and in case of a lid automatically associating the part of the touch screen to be used for movement input. This can be complemented by another sensor sensing what type of lid it is and automatically changing type of input detection based-on this extra sensor, i.e. if there Is to be a detection of normal push buttons or a user input unit according to the invention. Alternatively a user can set the display area for sensing input movements either by selection in a menu or by selection when entering the application.

The input determination unit described-earlier can as an alternative be provided as a part of the application unit or be part of some other general unit. The input determination unit and the application unit are furthermore normally provided in the form of one or more processors with associated program memory or memories storing program code for performing the functions of the units.

It is also possible to implement more than one user input unit in a movement input device, but then the portable electronic device would need more touch screens, one for each input unit. Another variation is to use a touch screen technology, where it is possible to detect multiple points of contact at the same time.

With the present invention there has been provided a movement input device that allows detection of all angles possible to move around an axis generally perpendicular to the lid. in a pure "analog" fashion by a touch screen display and in the preferred embodiment also the magnitude of the radial movement from the axis. The device is furthermore cheap to manufacture, does not include any electrical components or other types of expensive devices. Another advantage is that it makes use of a touch screen, which is already provided, in the portable electronic device.

The change to software in the phone for detecting movement inputs is also not hard to make, which makes the present invention even more attractive.

The invention claimed is:

1. A movement input device for use on a touch screen of a portable electronic device comprising:
   a fastening unit configured to secure the movement input device on the portable electronic device and having a top and bottom side, said fastening unit also being placed over and spaced above at least part of the touch screen, to form a gap between the fastening unit and at least part of the touch screen; and
   a user input unit fastened to and extending through the fastening unit, wherein the user input unit comprises:
   a user actuation part protruding from the top side of the fastening unit and being operable for actuation by a user for free angular movement with an angle of rotation around an axis (X) provided at least generally perpendicular to the top and bottom sides of the fastening unit; and
   a touch screen contact part protruding from the bottom side of the fastening unit that is configured to contact the touch screen in a position where at least an angle of the contact position in relation to the axis corresponds to the angle of the user actuation part in relation to the axis, so that movement of the user input unit is detected on the touch screen.

2. The movement input device according to claim 1, wherein the user actuation part and the touch screen contact part are joined together by a fastening part being fastened in the fastening unit while still allowing free movement round said axis.

3. The movement input device according to claim 1, wherein the touch screen contact part comprises a pin configured to directly contact the screen so that a radial movement of the touch screen contact part from the axis X corresponds to a radial movement of the user actuation part.

4. The movement input device according to claim 3, wherein the touch screen contact part further comprises a spring configured to force the pin in contact with the touch screen.

5. The movement input device according to claim 1, wherein the touch screen contact part comprises a disc having a rim, which contacts the screen at a fixed distance from the axis of the screen upon actuation of the user actuation part.

6. The movement input device according to claim 5, wherein the disc has parabolic shape.

7. A portable electronic device comprising:
   a body comprising a touch screen configured to detect inputs from a user on said screen; and
   a movement input device comprising:
      a fastening unit configured to secure the movement input device on the body and having a top and bottom side, said fastening unit also being placed over and spaced above at least part of the screen, to form a gap between the fastening unit and at least part of the touch screen; and
      a user input unit fastened to and extending through the fastening unit, wherein the user input unit comprises:
         a user actuation part protruding from the top side of the fastening unit and being operable for actuation by a user for free angular movement with an angle of rotation around an axis (X) provided at least generally perpendicular to the top and bottom sides of the fastening unit, and
         a touch screen contact part protruding from the bottom side of the fastening unit that is configured to contact the touch screen in a position where at least an angle of the contact position in relation to the axis corresponds to the angle of the user actuation part in relation to the axis, so that movement of the user input unit is detected on the touch screen.

8. The portable electronic device according to claim 7, further comprising an input determination unit for determining positions of input from a user.

9. The portable electronic device according to claim 7, wherein the fastening unit is rotatably connected to the body.

10. The portable electronic device according to claim 9, wherein the body further comprises a fastening unit sensing device configured to sense if the fastening unit is in position for providing inputs from the movement input device on the touch screen.

11. The portable electronic device according to claim 7, wherein the device is a mobile phone.

* * * * *